(12) United States Patent
Inaba (10) Patent No.: US 11,100,927 B2
(45) Date of Patent: Aug. 24, 2021

(54) INFORMATION PROVIDING DEVICE AND INFORMATION PROVIDING METHOD

(71) Applicant: Toyota Jidosha Kabushiki Kaisha, Toyota (JP)

(72) Inventor: Chihiro Inaba, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 93 days.

(21) Appl. No.: 16/400,592

(22) Filed: May 1, 2019

(65) Prior Publication Data

US 2019/0341043 A1    Nov. 7, 2019

(30) Foreign Application Priority Data

May 7, 2018 (JP) .............................. JP2018-089511

(51) Int. Cl.
| | | |
|---|---|---|
| *G10L 15/22* | (2006.01) | |
| *G10L 15/08* | (2006.01) | |
| *G06Q 30/02* | (2012.01) | |

(52) U.S. Cl.
CPC .......... *G10L 15/22* (2013.01); *G06Q 30/0266* (2013.01); *G10L 2015/088* (2013.01); *G10L 2015/226* (2013.01)

(58) Field of Classification Search
CPC ..... B60R 16/0373; G06F 3/167; G06Q 30/02; G06Q 30/0201; G06Q 30/0205; G06Q 30/0207; G06Q 30/0241; G06Q 30/0251; G06Q 30/0254; G06Q 30/0255; G06Q 30/0256; G06Q 30/0257; G06Q 30/0261; G06Q 30/0265; G06Q 30/0266; G06Q 30/0269; G06Q 30/0271; G06Q 30/0272; G10L 15/00; G10L 15/02; G10L 15/183; G10L 15/22; G10L 15/24; G10L 15/25; G10L 2015/088; G10L 2015/221; G10L 2015/225; G10L 2015/226; G10L 2015/228

See application file for complete search history.

(56) References Cited

U.S. PATENT DOCUMENTS

| | | | | |
|---|---|---|---|---|
| 2007/0186165 | A1* | 8/2007 | Maislos ................. | G06Q 30/02 715/728 |
| 2013/0173358 | A1* | 7/2013 | Pinkus ............... | G06Q 30/0265 705/14.1 |
| 2014/0310103 | A1* | 10/2014 | Ricci ...................... | G01C 21/26 705/14.62 |
| 2018/0093673 | A1* | 4/2018 | Yuhara .............. | B60W 50/0098 |

FOREIGN PATENT DOCUMENTS

| | | |
|---|---|---|
| JP | 2002024235 A | 1/2002 |
| JP | 2008281726 A | 11/2008 |
| JP | 2015018491 A | 1/2015 |

* cited by examiner

*Primary Examiner* — Andrew C Flanders
(74) *Attorney, Agent, or Firm* — Dinsmore & Shohl LLP (57) ABSTRACT

An information providing device includes circuitry configured to: acquire an uttered word which is uttered by a user and an utterance time at which the Littered word is uttered by the user; control output of offer information associated with the uttered word to the user; and restrict output of the offer information associated with the uttered word within a predetermined masking period from the utterance time of the uttered word.

10 Claims, 4 Drawing Sheets

| USER ID | UTTERED WORD | UTTERANCE HISTORY | INTEREST VALUE | SHORT-TERM INTEREST VALUE | LONG-TERM INTEREST VALUE |

FIG. 5B

| OFFER INFORMATION | POSITION INFORMATION | ATTRIBUTE INFORMATION |

INFORMATION PROVIDING DEVICE AND INFORMATION PROVIDING METHOD

CROSS-REFERENCE TO RELATED APPLICATION

This application claims priority to Japanese Patent Application No. 2018-089511 filed on May 7, 2018, incorporated herein by reference in its entirety.

BACKGROUND

1. Technical Field

The disclosure relates to an information providing device and an information providing method.

Description of Related Art

Japanese Unexamined Patent Application Publication No. 2002-24235 (JP 2002-24235 A) discloses an advertisement delivery system that delivers advertisement information to a first user and a second user based on the content of conversation between the first user with a first terminal and the second user with a second terminal. A server of the advertisement delivery system includes a delivery advertisement database that stores advertisement information indicating advertisements, a user attribute information database that stores user attribute information indicating attributes of the first user and the second user, a conversation analyzing means that analyzes conversation content and generates conversation content information, a delivery advertisement acquiring means that acquires advertisement information stored in the delivery advertisement database based on the conversation content information and the user attribute information, and an advertisement delivering means that delivers the advertisement information acquired by the delivery advertisement acquiring means to the first terminal and the second terminal based on the conversation content information.

SUMMARY

In the technique disclosed in JP 2002-24235 A, advertisement information based on the content of conversation between users is delivered, but when advertisement information matching the conversation content is always delivered, there is concern that the users may have a feeling of unease regarding analysis of the content of conversation.

The disclosure provides a technique capable of minimizing a user's feeling of unease corresponding to information which is provided based on the user's utterances.

A first aspect of the disclosure provides an information providing device including circuitry configured to: acquire an uttered word which is uttered by a user and an utterance time at which the uttered word is uttered by the user; control output of the offer information associated with the uttered word to the user; and restrict output of the offer information associated with the uttered word within a predetermined masking period from the utterance time of the uttered word.

According to the first aspect, appropriate offer information can be effectively output by outputting offer information associated with an uttered word which has been uttered by a user to the user. By restricting output of the offer information associated with the uttered word within a predetermined masking period from the utterance time of the uttered word, it is possible to minimize a user's feeling of unease due to use of the user's utterance information by an information providing system.

A second aspect of the disclosure provides an information providing method including: acquiring an uttered word which is uttered by a user and an utterance time at which the uttered word is uttered by the user; acquiring offer information which is to be output to the user; and controlling output of the offer information associated with the uttered word to the user. The controlling of the output of the offer information includes restricting output of the offer information associated with the uttered word within a predetermined masking period from the utterance time of the uttered word.

According to the second aspect, appropriate offer information can be effectively output by outputting offer information associated with an uttered word which has been uttered by a user to the user. By restricting output of the offer information associated with the uttered word within a predetermined masking period from the utterance time of the uttered word, it is possible to minimize a user's feeling of unease due to use of the user's utterance information.

A third aspect of the disclosure provides an information providing device including: a microphone that is mounted in a vehicle; an output unit that is provided in the vehicle; and circuitry configured to acquire an uttered word which is uttered by a user and an utterance time at which the uttered word is uttered, acquire vehicle position information, acquire first offer information associated with the uttered word, and output the first offer information via the output unit based on the vehicle position information.

According to the above aspects, it is possible to provide a technique capable of minimizing a user's feeling of unease corresponding to information which is provided based on the user's utterances.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Figure 1:
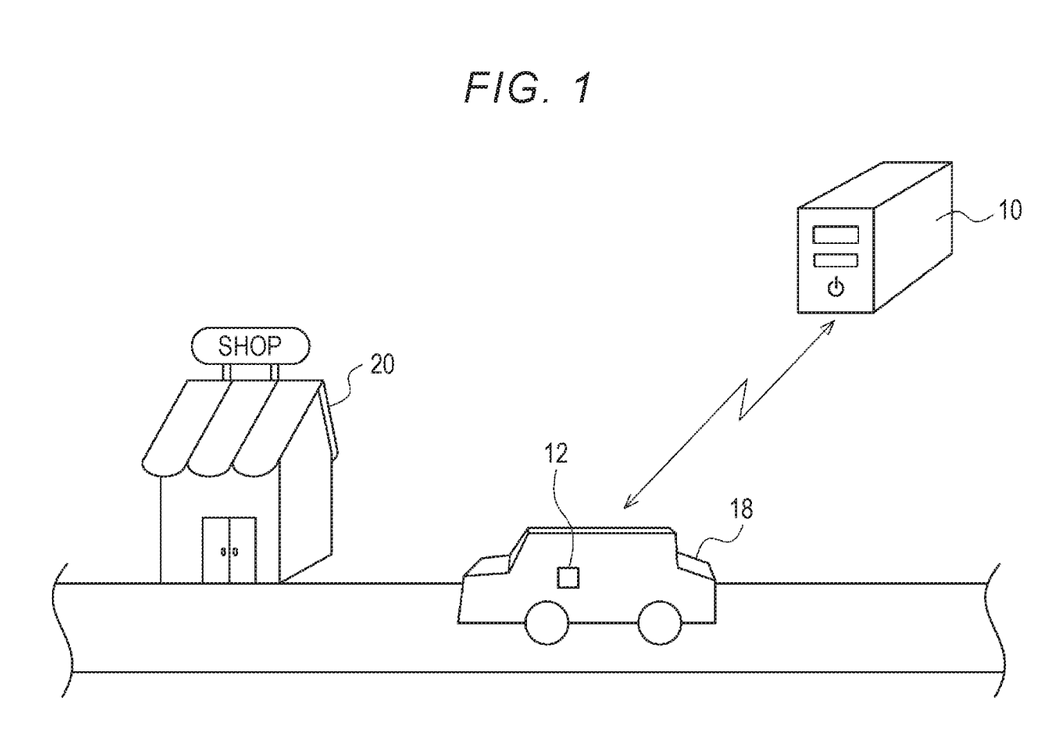
FIG. 1 is a diagram illustrating an information providing system according to an embodiment.

FIG. 1 is a diagram illustrating an it providing system according to an embodiment. The information providing system includes an onboard device 12 that is mounted in a vehicle 18 and a server device 10 that transmits and receives information to and from the onboard device 12 via a network.

When a driver is driving the vehicle 18, the onboard device 12 periodically transmits position information of the vehicle 18 to the server device 10. In FIG. 1, an object 20 is located around the vehicle 18. The driver of the vehicle 18 has uttered "I want to go to the object 20" at the object 20 at the time of driving in the past and the utterances have been acquired by the onboard device 12.

The server device 10 stores offer information for introducing the object 20 and information indicating the position of the object 20. Since the vehicle 18 is located around the object 20 and the driver has uttered speech associated with the object 20 in the past, the server device 10 transmits offer information associated with the object 20 to the onboard device 12. For example, when the object 20 is a sale store, the offer information for the object 20 may be novel product information, product coupon information, or the like. When the offer information is received from the server device 10, the onboard device 12 outputs the offer information to the driver by display or speech. The onboard device 12 serves as an information providing device that provides information to an occupant.

In this way, by providing information on an object 20 around a vehicle 18 to a driver, it is possible to cause the driver to effectively recognize the of 20 and to effectively deliver offer information to the driver. The server device 10 analyzes utterances of a driver and determines that offer information of the object 20 is to be output to the driver when the driver is determined to be interested in the object 20. Accordingly, it is possible to deliver information in which a driver is interested to the driver.

Figure 2:
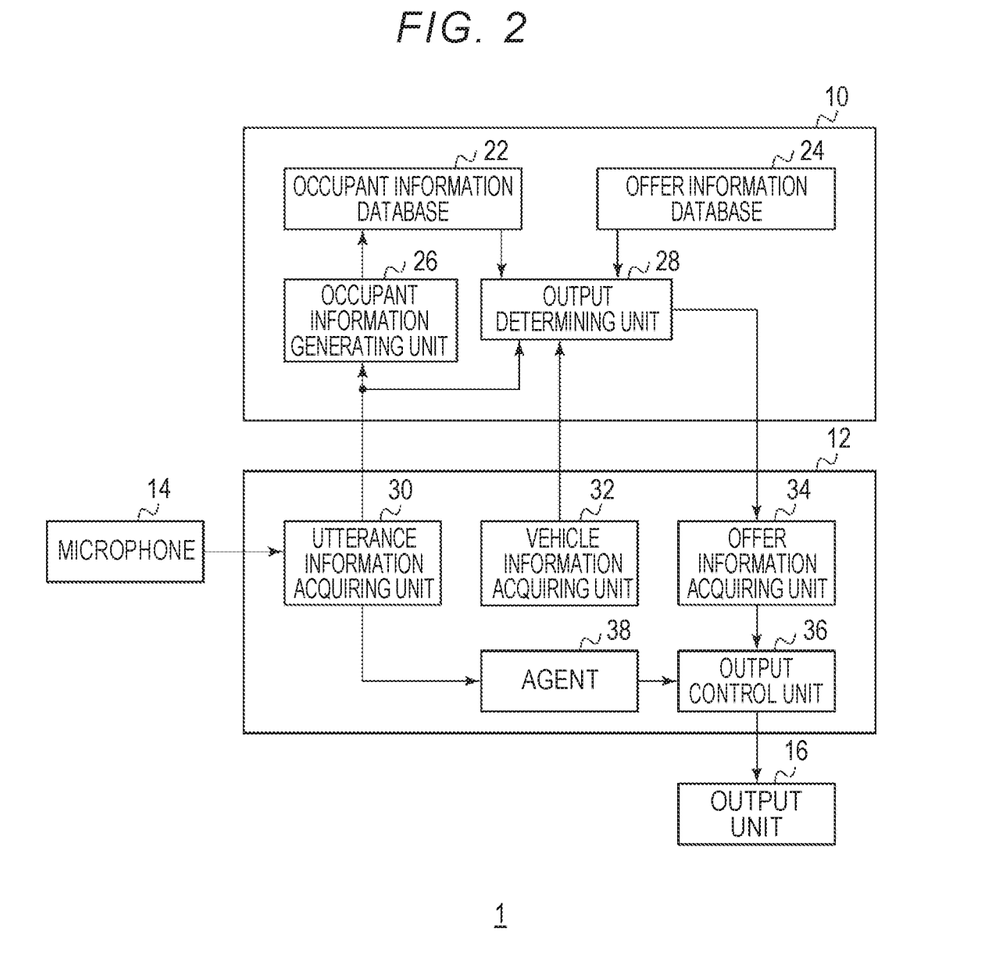
FIG. 2 is a diagram illustrating a functional configuration of the information providing system.

FIG. 2 is a diagram illustrating a functional configuration of the information providing system 1. In FIG. 2, elements which are described as functional blocks that perform various processes can be embodied by a circuit block, a memory, or an LSI in hardware and can be embodied by a program or the like loaded into the memory in software. Accordingly, it should be understood by those skilled in the art that such functional blocks can be embodied in various forms in only hardware, in only software, or in a combination thereof, and the disclosure is not limited to only either one thereof. In this embodiment, the information providing system 1 is constituted by electronic circuitry including the server device 10 and the onboard device 12.

The server device 10 includes an occupant information database 22, an offer information database 24, an occupant information generating unit 26, and an output determining unit 28. The onboard device 12 includes an utterance information acquiring unit 30, a vehicle information acquiring unit 32, an offer information acquiring unit 34, an output control unit 36, and an agent 38.

A microphone 14 is provided to detect sound in a vehicle, converts sound including utterances of an occupant into an electrical signal, and supplies the signal to the utterance information acquiring unit 30. An output unit 16 includes a speaker or a display and outputs information as voice or images to the occupant under the control of the output control unit 36.

The utterance information acquiring unit 30 acquires an uttered word which is uttered by a driver and an utterance time thereof. The utterance in acquiring unit 30 can acquire utterances of the driver from sound information detected by the microphone 14. The utterance information acquiring unit 30 may extract utterances of a driver or utterances of an occupant on a passenger seat from utterances of occupants through a voiceprint determining process. The utterance information acquiring unit 30 correlates the acquired utterance information of the occupants, the utterance time, and vehicle position information when utterances have been made and transmits the correlated information to the occupant information generating unit 26 of the server device 10.

The agent 38 exchanges information with a driver mainly through conversation and provides information on traveling as voice and/or images to support driving of the driver. The agent 38 may talk about traveling with the driver and may have an everyday conversation not associated with traveling. For example, the agent 38 may output voice "where are you going?" to prompt the driver to utter a destination, and output tourism information of the destination or the like by voice to provide tourism information to the driver.

In this way, the agent 38 executes an agent program and realizes communication with an occupant by recognizing utterances of an occupant and responding to the utterances. Taste information of an occupant can be acquired by conversation with the agent 38. The utterance information acquiring unit 30 is not limited to utterances of an occupant based on conversation with the agent 38, and may acquire utterances of a driver from conversation between the driver and another occupant or may acquire a soliloquy of the driver. The agent 38 may identify an occupant using an image captured by an onboard camera and have conversation with the identified occupant.

The vehicle information acquiring unit 32 acquires vehicle position information. The vehicle information acquiring unit 32 acquires vehicle position information using a global positioning system (GPS) or acquires vehicle position information, for example, from a navigation device. The vehicle information acquiring unit 32 periodically transmits the acquired vehicle position information to the output determining unit 28 of the server device 10.

The offer information acquiring unit 34 acquires offer information from the server device 10. The offer information is facility information for tourism guidance or advertisement information. By outputting offer information, information of facilities located around the vehicle or the like can be notified to an occupant.

The output control unit 36 controls the output unit 16 such that information is provided to an occupant as voice or images. The output control unit 36 causes the output unit 16 to output voice or images generated by the agent 38 and to output offer information acquired by the offer information acquiring unit 34.

The occupant information generating unit 26 of the server device 10 extracts an uttered word which is liked by an occupant from utterances of the occupant and stores the extracted uttered word in the occupant information database 22. The occupant information generating unit 26 extracts an uttered word which has been uttered positively. The occupant information generating unit 26 determines whether the extracted word is an uttered word liked by the occupant depending on whether words before and after the uttered word are positive. For example, when "I want to go camping," "I like camping," or the like is detected as an utterance of a driver, positive words such as "want to go" camping or "like" camping have been detected and thus the occupant information generating unit 26 determines that the driver has uttered a positive word for "camping" positively and stores "camping" as an uttered word liked by the driver in the occupant information database 22.

The occupant information generating unit 26 derives an interest value of the uttered word based on an utterance history of the uttered word. The interest value includes a short-term interest value and a long-term interest value and may be, for example, the sum of a short-term interest value and a long-term interest value. The short-term interest value is a parameter indicating a degree of interest of an occupant which decreases rapidly in the short term from an utterance time and in which it is assumed that the interest will have disappeared in several months. The long-term interest value is a parameter indicating a degree of interest of a driver in which it is assumed that the interest will be maintained continuously over the long term of half a year to a year or more.

Figure 3:
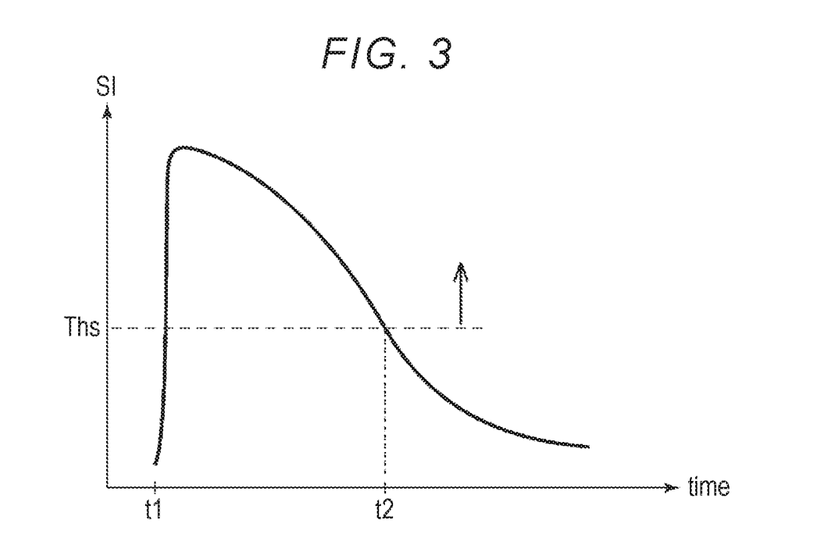
FIG. 3 is a diagram illustrating a short-term interest value SI.

FIG. 3 is a diagram illustrating a short-term interest value SI. The vertical axis represents the short-term interest value SI and the horizontal axis represents the time. When a positive uttered word of an occupant is acquired at time t1, the short-term interest value SI increases. When the short-term interest value SI of the uttered word is greater than a short-term threshold value Ths, offer information associated with the uttered word is provided. Since the short-term interest value SI decreases immediately from the utterance time and becomes equal to or less than the short-term threshold value Ths, a period in which offer information is provided is short.

Figure 4:
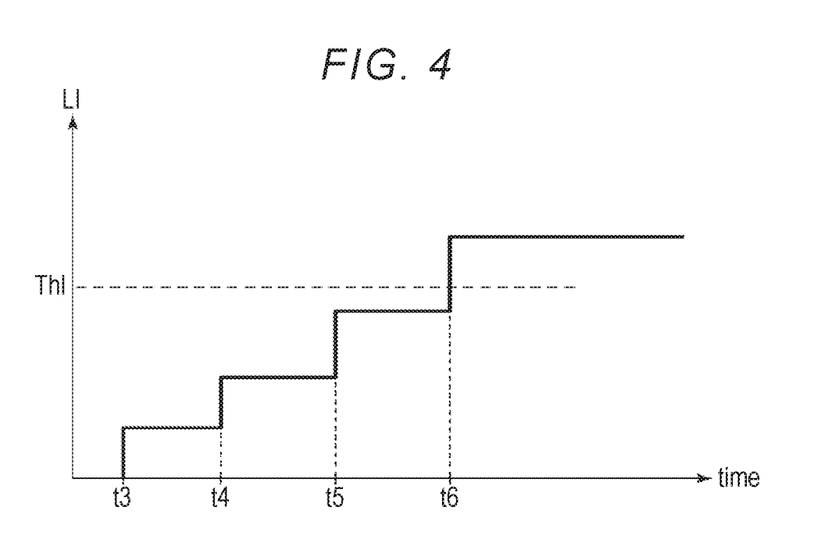
FIG. 4 is a diagram illustrating a long-term interest value LI.

FIG. 4 is a diagram illustrating a long-term interest value LI. The vertical axis represents the long-term interest value LI and the horizontal axis represents the time. When the long-term interest value LI of an uttered word is greater than a long-term threshold value Thl, offer information associated with the uttered word is provided. In FIG. 4, the same uttered word is acquired at times t3, t4, t5, and t6 and the long-term interest value LI is greater than the long-term threshold value Thl at time t6 which is a fourth utterance time.

In this way, the long-term interest value LI of an uttered word does not become greater than the threshold value by utterance once unlike the short-term interest value SI but becomes greater than the long-term threshold value Thl by utterance a plurality of times. The long-term interest value LI is derived based on the number of times of utterance and an utterance frequency and is derived such that the long-term interest value does not become greater than the long-term threshold value Thl by utterance at least once. The short-term interest value SI and the long-term interest value LI decrease with the elapse of time and a rate of decrease of the short-term interest value SI is higher than a rate of decrease of the long-term interest value LI. The occupant information generating unit 26 stores an equation or a table for deriving the short-term interest value SI and the long-term interest value LI.

Figure 5A:
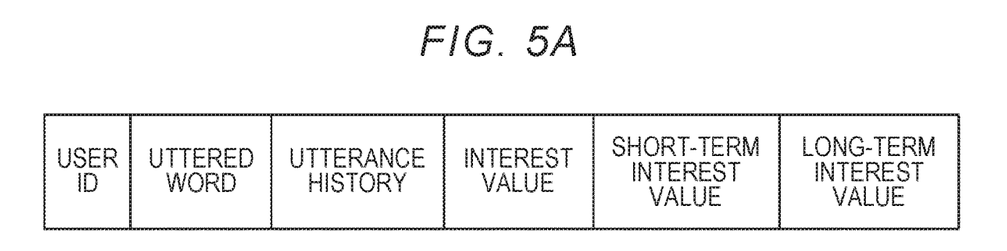
FIG. 5A is a diagram illustrating information which is stored in an occupant information database.

FIG. 5A illustrates information which is stored in the occupant information database 22. The occupant information database 22 stores a positive uttered word, an utterance history, an interest value, a short-term interest value, and a long-term interest value in correlation with a user ID. The utterance history includes an utterance time, the number of times of utterance, and an utterance position. A user ID is given to each occupant who boards the vehicle.

Figure 5B:
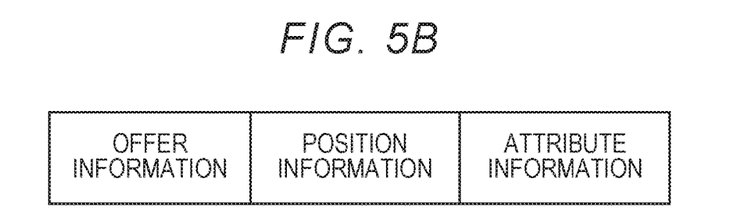
FIG. 5B is a diagram illustrating information which is stored in an offer information database.

FIG. 5B illustrates information which is stored in the offer information database 24. The offer information database 24 stores offer information in correlation with position information associated with offer information and attribute information indicating attributes of offer information. The position information associated with offer information includes position information of a store corresponding to the offer information or the like.

Offer information is provided to an occupant of the vehicle when the vehicle is located within a predetermined range from a position of a facility indicated by the offer information. Attribute information is information for correlating an uttered word of an occupant with offer information and the word is stored. For example, attribute information for offer information of an outdoor product store includes information associated with the outdoor product store such as "outdoor," "camping," "climbing," and "tracking." By referring to the attribute information, offer information associated with the uttered word can be provided.

Referring back to FIG. 2, the output determining unit 28 of the server device 10 determines an output of offer information associated with an uttered word for an occupant. Accordingly, it is possible to provide effective information based on an occupant's taste by outputting offer information associated with the uttered word.

The output determining unit 28 determines that offer information associated with an uttered word is to be output based on the vehicle position information. For example, when the vehicle is located in the vicinity of an utterance position of an uttered word of a driver, the output determining unit 28 may determine offer information associated with the uttered word of the driver is to be output. The vicinity of an utterance position refers to being within a predetermined range from the utterance position. Accordingly, it is possible to output offer information based on the position of the vehicle. By outputting offer information based on a past utterance position, it is possible to provide information of an object for which a driver showed an interest in a past utterance.

The output determining unit 28 determines whether offer information associated with art uttered word is to be output based on position information of the offer information and the vehicle position information. For example, the output determining unit 28 may determine that offer information associated with an uttered word is to be output when the vehicle is located within a predetermined range from a position indicated by position information of the offer information. Accordingly, it is possible to output offer information on an object in the vicinity of the vehicle and to allow an occupant to easily recognize the offer information.

The output determining unit 28 restricts output of offer information to an occupant within a predetermined masking period from the utterance time of the uttered word. That is, immediately after an occupant has uttered an uttered word, output of offer information associated with the uttered word to an occupant is prohibited. The predetermined masking period may be set to, for example, any period from one hour to several days or may be set to a period of one trip until the vehicle is powered off after the uttered word has been uttered. In this way, by prohibiting output of offer information associated with the uttered word within the predetermined masking period from the utterance time of the uttered word, it is possible to minimize a feeling of unease due to storage of utterance information of an, occupant in the information providing system 1.

The output determining unit 28 may be configured to restrict output of offer information within the predetermined masking period from an utterance time of an uttered word even when the vehicle is located in the vicinity of the position indicated by the position information of the offer information associated with the uttered word.

The output determining unit 28 determines that offer information is to be output to an occupant when an interest value of an uttered word is greater than a predetermined threshold value and restricts output of offer information when the interest value of the uttered word is equal to or less than the predetermined threshold value. Accordingly, it is possible to exclude an uttered word for which the interest of an occupant is low and to provide appropriate offer information.

The output determining unit 28 restricts output of offer information within the predetermined masking period from an utterance time of an uttered word even when the interest value of the uttered word is greater than a predetermined threshold value. Accordingly, it is possible to minimize a feeling of unease due to storage of utterance information of an occupant in the information providing system 1.

The output determining unit 28 may determine that offer information not associated with an uttered word is to be output when the vehicle is located in the vicinity of position information of the offer information. That is, the output determining unit 28 may mix offer information associated with an uttered word and offer information not associated with the uttered word (for example, information in which position information correlated with the offer information corresponds to the position of the vehicle) and may output the mixed offer information at predetermined proportions. Accordingly, it is possible to minimize a feeling of unease due to storage of utterance information of an occupant in the information providing system 1. The output determining unit 28 may control output of offer information such that the proportion of offer information not associated with an uttered word is greater than the proportion of offer information associated with an uttered word. The proportions at which the offer information associated with an uttered word and the offer information not associated with the uttered word are output may be set based on the utterance history of each uttered word, and the output proportion of the offer information associated with the uttered word may be set to, for example, a value between 20 percent to 80 percent. The "offer information not associated with an uttered word" may be offer information acquired without considering a correlation with the uttered word or may be offer information Which is obtained by excluding "offer information associated with the uttered word" from the offer information acquired without considering a correlation with the uttered word.

The output determining unit 28 may determine that offer information associated with an uttered word is to be output even when the vehicle is not located in the vicinity of the position of the offer information. That is, the output determining unit 28 mixes offer information when the vehicle position information matches the position information of the offer information and offer information when the vehicle position information does not match the position information of the offer information and outputs the mixed offer information at predetermined proportions. Offer information which is provided to an occupant includes information which is output based on a vehicle position, information which is output based on utterances from an occupant regardless of the vehicle position, and information which is output based on the vehicle position and utterances from an occupant. Accordingly, it is possible to minimize a feeling of unease due to storage of utterance information of an occupant in the information providing system 1.

The output determining unit 28 may classify an uttered word into a short-term interesting word or a long-term interesting word based on, a short-term, interest value and/or a short-term interest value of the uttered word. For example, the output determining unit 28 classifies an uttered word of which the long-term interest value is greater than a predetermined long-term threshold value into a long-term interesting word, and classifies an uttered word of which the short-term interest value is greater than a predetermined short-term threshold value into a short-term interesting word. Since the long-term interest value is derived based on the number of times of utterance and the utterance frequency of an uttered word, the output determining unit 28 classifies an uttered word into a short-term interesting word or a long-teen interesting word based on the utterance history of the uttered word. The output determining unit 28 may classify an uttered word into a short-term interesting word when the uttered word is seasonal or time-limited, and may classify an uttered word into a short-term interesting word, for example, when the uttered word indicates a limited-time product.

A short-term interesting word refers to an utterance in which an occupant is determined to have an interest in a short term, and a long-term interesting word refers to an utterance in which an occupant is determined to have an interest in a long term. The output determining unit 28 changes a period in which offer information associated with an uttered word is provided based on the interest value of the uttered word, that is, depending on whether the uttered word is a short-term interesting word or a long-term interesting word. Provision of offer information associated with a short-term interesting word is ended within several months, and offer information associated with a long-term interesting word is provided in a period of half a year to a year or more. Accordingly, provision of offer information associated with a seasonal or time-limited uttered word for which the interest is reduced in a short term can be ended within an appropriate period. Offer information associated with an uttered word in which an occupant has an interest can be effectively provided in a long term.

The output determining unit 28 changes a predetermined masking period based on an interest value of an uttered word, that is, depending on whether the uttered word is a short-term interesting word or a long-term interesting word, and sets the masking period in offer information associated with a short-term interesting word to be shorter than that for a long-term interesting word. That is, the predetermined masking period is set to a time which varies depending on the utterance history of an uttered word. For example, a masking period of about 30 minutes to 60 minutes from an utterance time is set for a short-term interesting word, and a masking period of about one day from an utterance time is set for a long-term interesting word. As the masking period becomes longer, a feeling of unease due to storage of utterance information of an occupant in the information providing system 1 can be further minimized, but since a short-term interest of an occupant can be reduced rapidly, it is possible to provide effective information by setting the masking period for a short-term interesting word to be short.

The output determining unit 28 restricts output of offer information associated with an uttered word within a predetermined masking period from a time at which the offer information associated with the uttered word has been output. Accordingly, it is possible to cause an occupant to have difficulty in feeling that utterance information of the occupant is used.

The output determining unit 28 transmits offer information based on the determination result to the offer information acquiring unit 34 of the onboard device 12, and the output control unit 36 executes control to output the offer information acquired by the vehicle information acquiring unit 32 to an occupant via the output unit 16.

The above-mentioned embodiment is only an example and it will be understood by those skilled in the art that various modified examples are possible by combination of the elements thereof and that such modified examples are included in the scope of the disclosure.

In the embodiment, the information providing system 1 includes the server device 10 and the onboard device 12, the output determining unit 28 of the server device 10 may be provided in the onboard device 12, and the occupant information database 22 and the occupant information generating unit 26 may be provided in the onboard device 12. The occupant information database 22 and the offer information database 24 may be provided in different server devices.

In the embodiment, an example in which the information providing system 1 includes the server device 10 and the onboard device 12 has been described above, but the aspect according to the disclosure is not limited to the example. For example, the information providing system 1 may include a server device 10 and a mobile terminal device. According to this modified example, a mobile terminal device which is owned by a user acquires utterances of the user and an utterance time thereof and controls, output of offer information associated with an uttered word of the user to the user. An output control unit of the mobile terminal device restricts output of offer information associate with the uttered word within a predetermined masking period from the utterance time of the uttered word. The mobile terminal device may control output of offer information associated with an uttered word based on position information of the mobile terminal device. In this way, the mobile terminal device also serves as an information providing device.

The information providing system 1 may include a server device 10, an onboard device 12, and a mobile terminal device. According to this modified example, the server device 10 can acquire user information from the onboard device 12 and the mobile terminal device, and the onboard device 12 and the mobile terminal device serve as an information providing device. The onboard device 12 may serve as an information providing device when a user is in a vehicle, and the mobile terminal device may serve as an information providing device when the user is not in a vehicle. The mobile terminal device may acquire information indicating that the user is in the vehicle from the onboard device 12 via the server device 10 and stop provision of information when the user boards the vehicle. In this way, the server device 10 may collect information of the user from the onboard device 12 and the mobile terminal device and one of the onboard device 12 and the mobile terminal device may output offer information to the user depending on a boarding state.

What is claimed is:

1. An information providing device comprising a microphone provided in a vehicle and circuitry configured to:
   acquire an uttered word, using voice information detected by the microphone, which is uttered by a user and an utterance time at which the uttered word is uttered by the user;
   control output of offer information associated with the uttered word to the user;
   restrict output of the offer information associated with the uttered word within a predetermined masking period from the utterance time of the uttered word, wherein the predetermined masking period is set to a period which varies depending on an utterance history of the uttered word; and
   output the offer information associated with the uttered word when an interest value of the uttered word derived based on the utterance history of the uttered word is equal to or greater than a predetermined threshold value, wherein the interest value of the uttered word depends on whether the uttered word is a short-term interesting word or a long-term interesting word, and the predetermined masking period is set to be shorter when the uttered word is associated with the short-term interesting word than when the uttered word is associated with the long-term interesting word.

2. The information providing device according to claim 1, wherein
   the circuitry is configured to acquire vehicle position information and to control output of the offer information associated with the uttered word based on the vehicle position information.

3. The information providing device according to claim 2, wherein
   the circuitry is configured to control output of the offer information associated with the uttered word based on position information of a facility corresponding to the offer information and the vehicle position information.

4. The information providing device according to claim 1, further comprising
   an output unit that is provided in the vehicle,
   wherein the circuitry is configured to cause the output unit to output the offer information associated with the uttered word to the user.

5. The information providing device according to claim 1, wherein the circuitry is further configured to:
   classify the uttered word of which a long-term interest value is greater than a predetermined long-term threshold value into the long-term interesting word, and
   classify the uttered word of which a short-term interest value is greater than a predetermined short-term threshold value into the short-term interesting word.

6. The information providing device according to claim 1, wherein the circuitry is further configured to:
   classify the uttered word into the short-term interesting word when the uttered word is seasonal or time-limited.

7. An information providing method comprising:
   (a) acquiring an uttered word, using voice information detected by a microphone, which is uttered by a user and an utterance time at which the uttered word is uttered by the user;
   (b) acquiring offer information which is to be output to the user;
   (c) controlling output of the offer information associated with the uttered word to the user,
   wherein the step (c) includes restricting output of the offer information associated with the uttered word within a predetermined masking period from the utterance time of the uttered word, wherein the predetermined masking period is set to a period which varies depending on an utterance history of the uttered word; and
   output the offer information associated with the uttered word when an interest value of the uttered word derived based on the utterance history of the uttered word is equal to or greater than a predetermined threshold value, wherein the interest value of the uttered word depends on whether the uttered word is a short-term interesting word or a long-term interesting word, and the predetermined masking period is set to be shorter when the uttered word is associated with the short-term interesting word than when the uttered word is associated with the long-term interesting word.

8. An information providing device comprising:
   a microphone that is mounted in a vehicle;
   an output unit that is provided in the vehicle; and
   circuitry configured to
      acquire an uttered word, using voice information detected by the microphone, which is uttered by a user and an utterance time at which the uttered word is uttered,
      acquire vehicle position information,
      acquire first offer information associated with the uttered word,
      output the first offer information via the output unit based on the vehicle position information, and restrict output of the first offer information associated with the uttered word within a predetermined masking period from the utterance time of the uttered word, wherein the predetermined masking period is set to a period which varies depending on an interest value of the uttered word derived based on a classification of the uttered word as a long-term interest word or a short-term interest word, wherein the predetermined masking period is set to be shorter when the uttered word is associated with the short-term interest word than when the uttered word is associated with the long-term interest word.

9. The information providing device according to claim 8, wherein the circuitry is configured to acquire second offer information associated with the vehicle position information and to output the first offer information and the second offer information at a predetermined ratio via the output unit.

10. The information providing device according to claim 8, wherein the circuitry is configured to determine to output the first offer information associated with the uttered word when the vehicle positions within a predetermined range from a facility corresponding to the first offer information.

* * * * *